(12) United States Patent
Chen et al.

(10) Patent No.: US 11,339,915 B2
(45) Date of Patent: May 24, 2022

(54) WALL MOUNT STRUCTURE

(71) Applicant: Lenovo (Beijing) Co., Ltd., Beijing (CN)

(72) Inventors: Dikang Chen, Beijing (CN); Yangtao Kang, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 17/206,160

(22) Filed: Mar. 19, 2021

(65) Prior Publication Data

US 2021/0293372 A1   Sep. 23, 2021

(30) Foreign Application Priority Data

Mar. 23, 2020   (CN) .......................... 202010209702.6

(51) Int. Cl.
| | | |
|---|---|---|
| *F16M 11/00* | (2006.01) | |
| *F16M 11/10* | (2006.01) | |
| *F16M 13/02* | (2006.01) | |
| *F16B 1/00* | (2006.01) | |

(52) U.S. Cl.
CPC .......... *F16M 11/105* (2013.01); *F16M 13/02* (2013.01); *F16B 2001/0035* (2013.01)

(58) Field of Classification Search
CPC ............................. F16M 11/105; F16M 13/02
USPC ................. 248/284.1, 683, 206.5, 309.4
See application file for complete search history.

(56) References Cited

U.S. PATENT DOCUMENTS

| | | | |
|---|---|---|---|
| 2014/0265765 A1 | 9/2014 | Khodapanah et al. | |
| 2015/0249302 A1 | 9/2015 | Witter et al. | |
| 2020/0315047 A1* | 10/2020 | Kang .................. | H05K 5/0226 |
| 2021/0244995 A1* | 8/2021 | Andrei ................ | A63B 21/169 |

FOREIGN PATENT DOCUMENTS

| | | |
|---|---|---|
| CN | 202927421 U | 5/2013 |
| CN | 206329892 U | 7/2017 |
| CN | 208546482 U | 2/2019 |
| CN | 109945050 A | 6/2019 |
| CN | 209705563 U | 11/2019 |
| DE | 202016006395 U1 | 12/2016 |

* cited by examiner

*Primary Examiner* — Todd M Epps
(74) *Attorney, Agent, or Firm* — Anova Law Group, PLLC

(57) ABSTRACT

A wall mount structure is used to hang a target object on a wall. The wall mount structure includes a base detachably mounted on the wall and provided with a first magnetic unit, and a rotating seat. The rotating seat includes a rotating member rotatably mounted at a magnetic member, and used to rotate by a set angle relative to the magnetic member to reach a set position and connect the target object, the magnetic member including a second magnetic unit mutually attracted with the first magnetic unit to fix a relative position between the magnetic member and the base, and a limiting member connected between the rotating member and the magnetic member, and used to limit the relative position between the rotating member and the magnetic member, and to keep the rotating member at the set position.

10 Claims, 8 Drawing Sheets

WALL MOUNT STRUCTURE

CROSS-REFERENCE TO RELATED APPLICATION

This application is a continuation of Chinese Patent Application No. 202010209702.6, filed Mar. 23, 2020, the entire content of which is incorporated herein by reference.

TECHNICAL FIELD

The present disclosure relates to the field of product mounting technology and, in particular, to a wall mount structure.

BACKGROUND

Many products need to be mounted. For example, liquid-crystal displays (LCDs) or LCD televisions, etc. often need to be mounted. Existing products are usually mounted on the wall by inserting screws in the wall and then hanging on the head of the screws through the wall mount holes.

However, the screws are often not fixed in the wall mount holes in this method. The screws can be kept in the wall mount holes, relying on the gravity of the products under normal circumstances. But the products can easily fall off from the screws or any other connection parts if there is vibration or the hanging parts are not in the right position. This not only results in hidden danger of damage of the products, but also limits application of the hanging method in complex environments. Further, the current mounting method of the products cannot support 360° rotation and free switching between horizontal and vertical directions. Thus, the user experience is impaired.

SUMMARY

One aspect of the present disclosure provides a wall mount structure used to hang a target object on a wall. The wall mount structure includes a base detachably mounted on the wall and provided with a first magnetic unit, and a rotating seat. The rotating seat includes a rotating member rotatably mounted at a magnetic member, and used to rotate by a set angle relative to the magnetic member to reach a set position and connect the target object, the magnetic member including a second magnetic unit mutually attracted with the first magnetic unit to fix a relative position between the magnetic member and the base, and a limiting member connected between the rotating member and the magnetic member, and used to limit the relative position between the rotating member and the magnetic member, and to keep the rotating member at the set position.

REFERENCE NUMERALS

Figure 1:
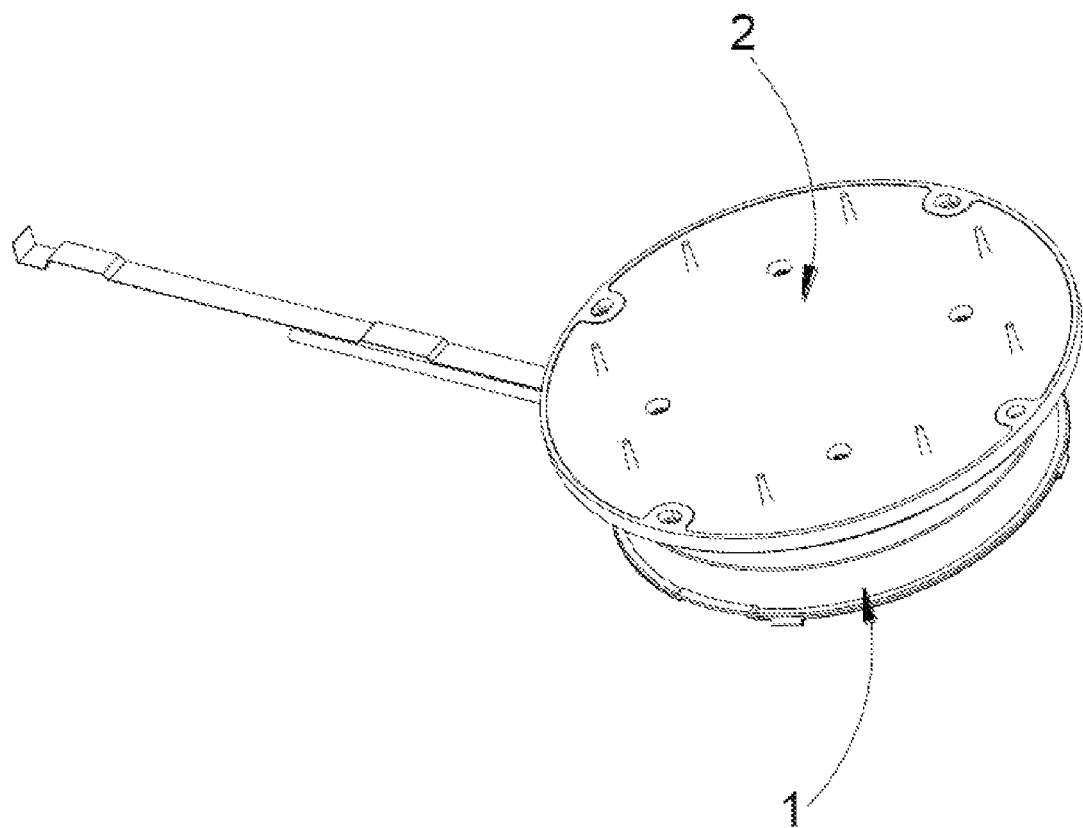
FIG. 1 is a schematic structural diagram of a wall mount structure consistent with embodiments of the present disclosure.

Base 1; First magnetic unit 11; Annular groove 12; Second electrical connection unit 13; Sliding groove 14; Limitation opening 15; Through hole 121; Rotating seat 2; Rotating member 21; Magnetic member 22; Limiting member 23; Rotation casing 211; Rotation bearing 212; Connection plate 213; Bearing fixing plate 214; First electrical connection unit 215; Second magnetic unit 221; Turntable 222; Inner cavity 2111; Opening 2112; Limiting step 2113; Ball groove 2221; Annular groove 2141; Bayonet 2142; Mounting plate 3; Sliding rail 31; Limitation buckle 311.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

FIG. 1 is a schematic structural diagram of a wall mount structure consistent with embodiments of the present disclosure. The wall mount structure is used to hang a target object on a wall. The target object can be a liquid-crystal display (LCD) or an LCD television, etc. As shown in FIG. 1, the wall structure includes a base 1 and a rotating seat 2.

Figure 2:
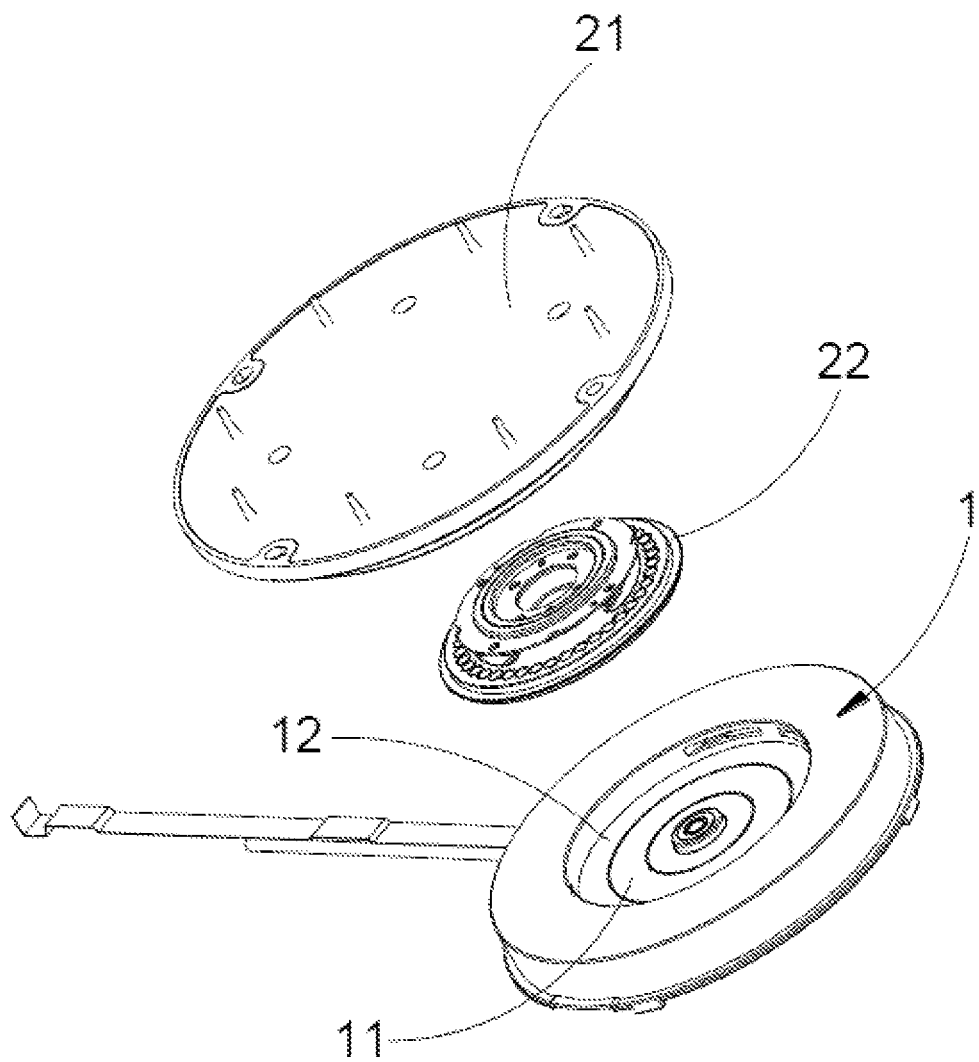
FIG. 2 is an exploded view of the wall mount structure shown in FIG. 1.
Figure 3:
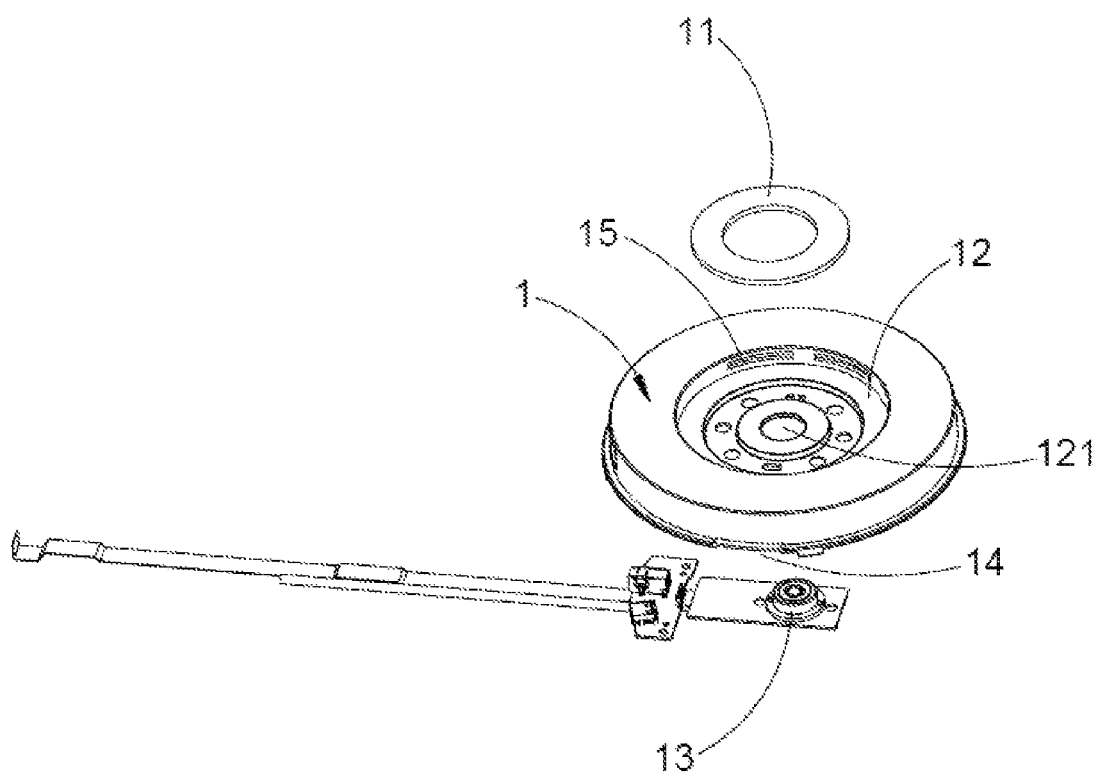
FIG. 3 is an exploded view of a base shown in FIG. 2.
Figure 4:
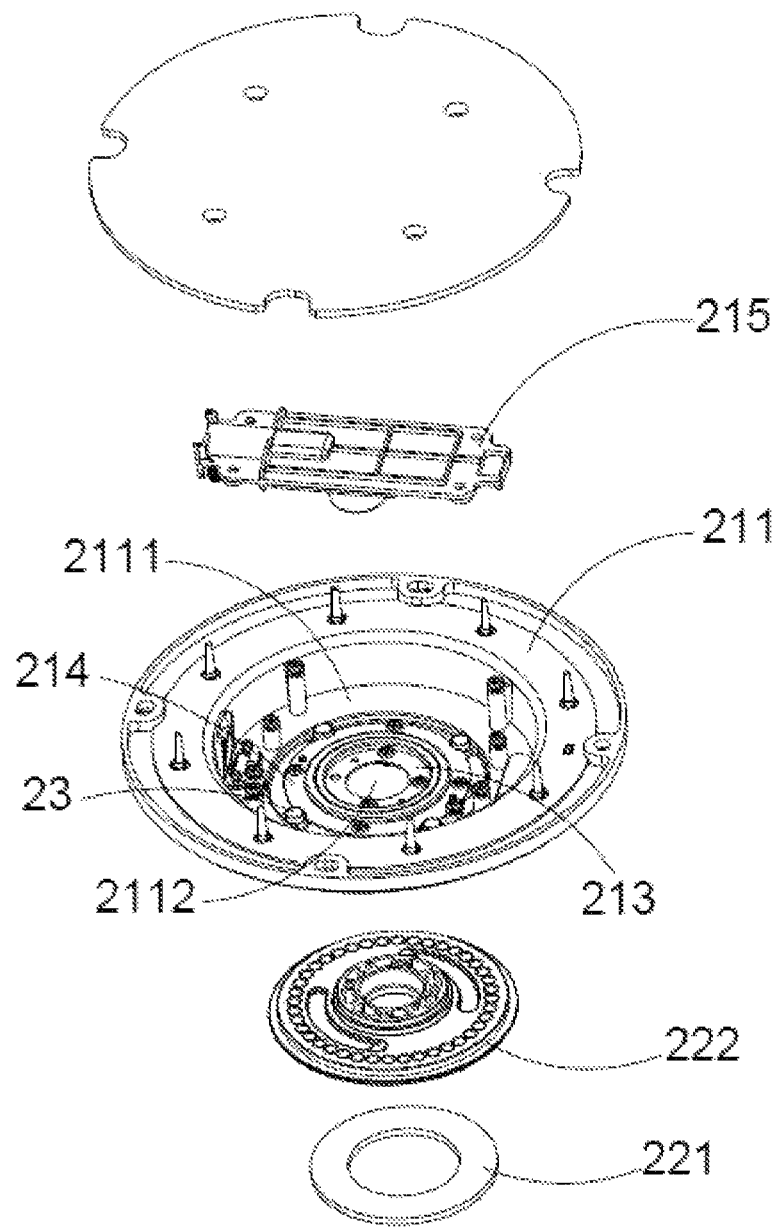
FIG. 4 is an exploded view of a rotating seat shown in FIG. 2.

FIG. 2 is an exploded view of the wall mount structure shown in FIG. 1. FIG. 3 is an exploded view of a base shown in FIG. 2. As shown in FIG. 3, the base 1 is detachably mounted on the wall, and the base 1 and provided with a first magnetic unit 11. FIG. 4 is an exploded view of a rotating seat 2 shown in FIG. 2. As shown in FIG. 2 and FIG. 4, the rotating seat 2 includes a rotating member 21, a magnetic member 22, and a limiting member 23. The rotating member 21 is rotatably mounted at the magnetic member 22. The magnetic member 22 includes a second magnetic unit 221. The limiting member 23 is connected between the rotating member 21 and the magnetic member 22 to limit a relative position between the rotating member 21 and the magnetic member 22. The rotating member 21 can rotate by a set angle relative to the magnetic member 22 to reach a set position, and the limiting member 23 can cause the rotating member 21 to keep at the set position. A second magnetic unit 221 and the first magnetic unit 11 are mutually attracted to each other to fix the relative position between the magnetic member 22 and the base 1. The rotating member 21 is used to connect the target object.

In one embodiment, for a specific use, the base 1 is mounted on the wall at first, and then the target object is connected to the rotating member 21 of the rotating seat 2. The magnetic member 22 is fixed at the base 1 using mutual attraction between the first magnetic unit 11 and the second magnetic member 221, thereby enable the rotating seat 2 to be rotatable relative to the base 1. Thus, the target object can be rotated relative to the base 1, and the limiting member 23 is used to keep the rotating member 21 at a position after rotation. The wall mount structure can realize blind assembly by directly connecting the magnetic member 22 to the base 1 after the base 1 is fixed on the wall, which improves the convenience of assembly. Additionally, the target object can be rotated 360° to be placed vertically, horizontally, or at any angle to meet various needs of usage situations of the target object by a user, thereby improving convenience of using the target object and enhancing user experience.

In one embodiment, the base 1 is provided with an annular groove 12. The first magnetic unit 11 is correspondingly arranged at the bottom of the annular groove 12. The magnetic member 22 is embedded in the annular groove 12 to cause the second magnetic unit 221 of the magnetic member 22 to be mutually attracted with the first magnetic unit 11 in the annular groove 12. Embedding the magnetic member 22 in the annular groove 12 of the base 1 can improve stability of connection and perform positioning of assembly, which is conducive to realize the blind assembly of the base 1 and the rotating seat 2 and further improves the convenience of assembly.

Figure 5:
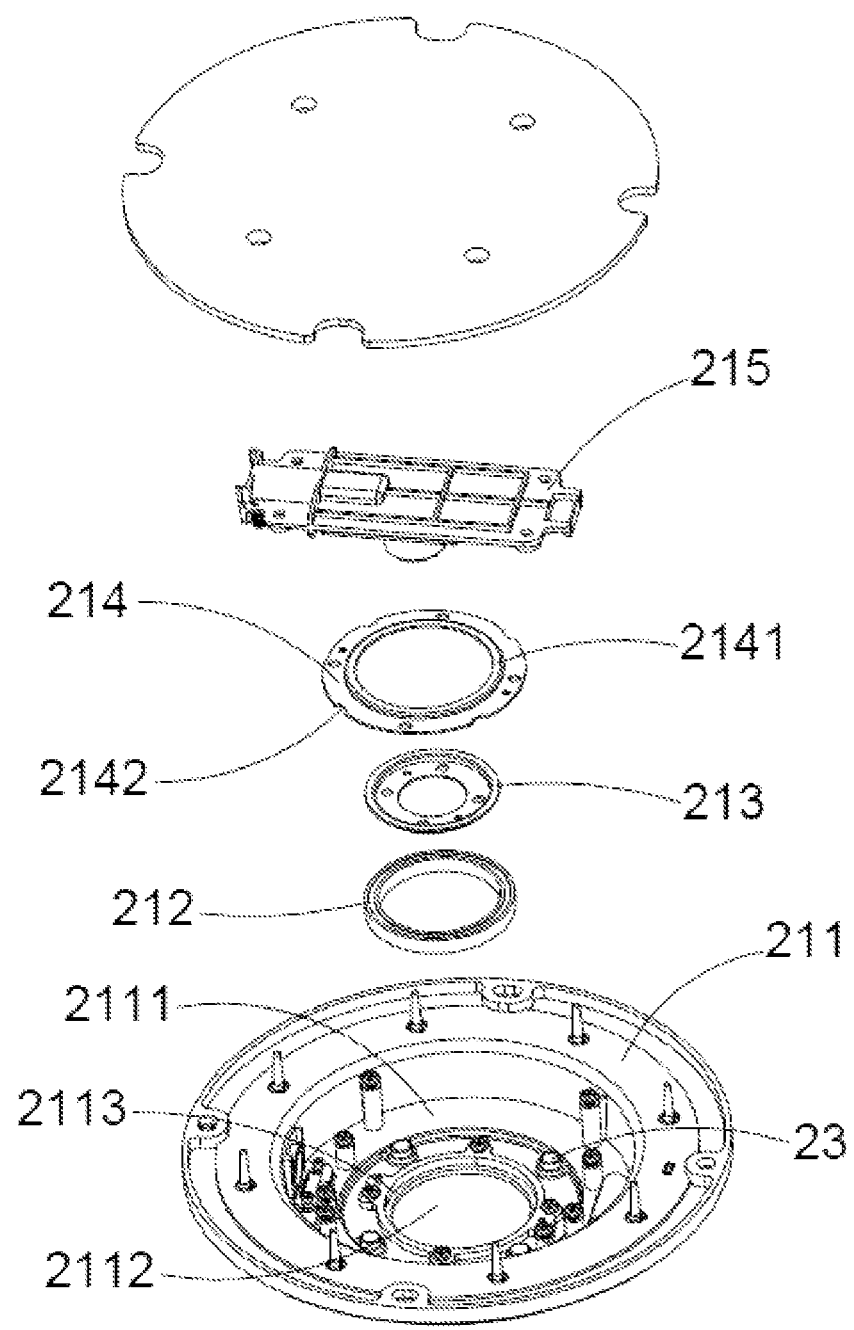
FIG. 5 is a schematic structural diagram of a rotating member shown in FIG. 3.

FIG. 5 is a schematic structural diagram of a rotating member 21 shown in FIG. 3. As shown in FIG. 5, in one embodiment, the rotating member 21 includes a rotation casing 211, a rotation bearing 212, and a connection plate 213. The rotation casing 211 includes a hollow inner cavity 2111. The rotation casing 211 is also provided with an opening 2112 connected to the inner cavity 2111 on a side of the rotation casing 211. An inner wall of the opening is provided with a limiting step 2113. The rotation bearing 212 is arranged at the limiting step 2113. The connection plate 213 is located in the inner cavity 2111. The connection plate 213 is buckled on a side of the rotation bearing 212 to perform axial limitation to the rotation bearing 212. The connection plate 213 is fixedly connected to the magnetic member 22 to enable the rotation casing 211 to be rotatable relative to the magnetic member 22. The rotation casing 211 is used to connect with the target object to enable the target object to be rotatable relative to the magnetic member 22, thereby meeting the needs of different usage situations by adjusting an angle of the target object.

Figure 6:
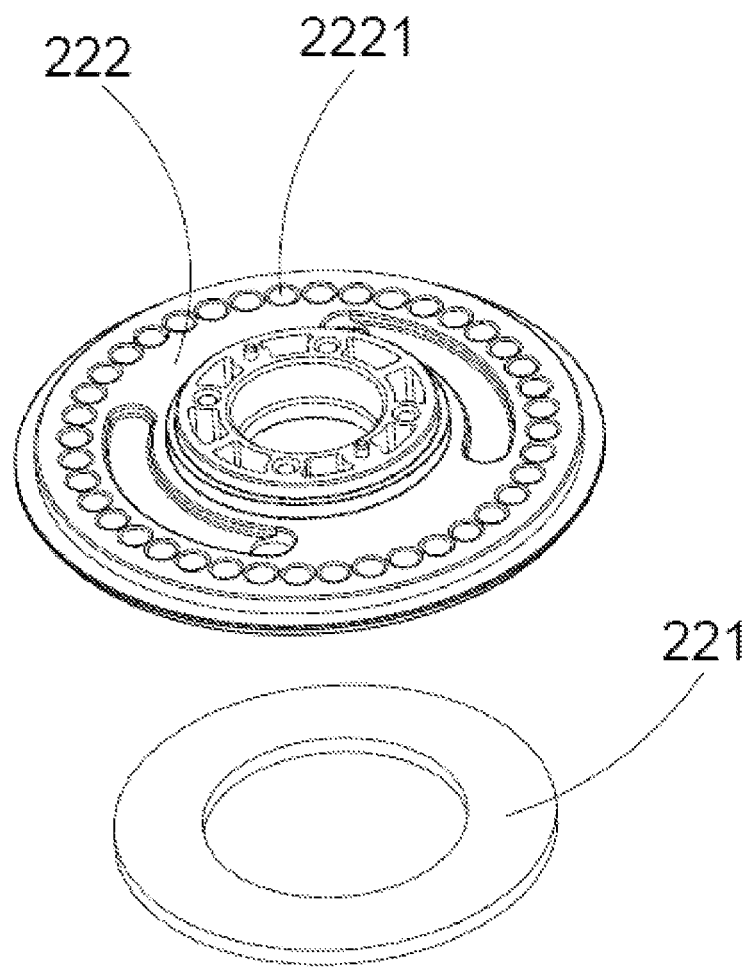
FIG. 6 is a schematic structural diagram of a magnetic member shown in FIG. 3.

FIG. 6 is a schematic structural diagram of a magnetic member 22 shown in FIG. 3. As shown in FIG. 6, in one embodiment, the magnetic member 22 further includes a turntable 222. The turntable 222 is provided with a plurality of ball grooves 2221 on a side close to the rotation casing 211. The plurality of ball grooves 2221 are evenly distributed at the turntable 222 with a center of the turntable 222 as the center of a circle and a set distance as a radius. The second magnetic unit 221 is arranged at another side of the turntable 222 opposite to the plurality of ball grooves 2221. and is connected to the ball groove 2221. As shown in FIG. 5, the limiting member is provided at the rotation casing 211 and includes at least one elastically retractable ball. The at least one ball protrudes out of an outer wall of the rotation casing 211 and matches the ball groove 2221 at the turntable 222. The rotation casing 211 rotates the set distance relative to the magnetic member 22 to cause the at least one ball to match the ball groove 2221 at a corresponding position. Matching the at least one ball with the ball groove 2221 can ensure that the rotation casing 211 can be stably maintained at the position where it stays after rotating to any position rather than rotate to another position due to a shift of the center of gravity or other external forces, thereby improving the stability of the rotation casing 211 after a position adjustment.

In one embodiment, there is a plurality of elastically retractable balls. The plurality of balls are evenly distributed at the outer wall of the rotation casing 211 along a circumferential direction of the rotation casing 211. Each of the plurality of balls matches with one of the plurality of ball grooves 2221. Matching the plurality of balls with the plurality of the ball grooves 2221 can further improve the stability of the rotation casing 211 after the position adjustment.

As shown in FIG. 5, in one embodiment, the rotating member 21 further includes a bearing fixing plate 214. The bearing fixing plate 214 is buckled at a side of the rotation bearing 212 and fixed in the inner cavity 2111 of the rotation casing 211. A side of the bearing fixing plate 214 close to the rotation bearing 212 is also provided with an annular groove 2141 to match with an outer edge of the rotation bearing 212. The outer edge of the rotation bearing 212 can be limit and fixed by the annular groove 2141 to ensure the rotation bearing 212 does not appear an axial shift. The outer edge of the bearing fixing plate 214 is also provided with a bayonet 2142, which matches one of the plurality of balls, and is used to limit and fix the one of the plurality of balls to prevent the one of the plurality of balls from loosening during the rotation.

As shown in FIG. 5, in one embodiment, the rotating member 21 further includes a first electrical connection unit 215. The first electrical connection unit 215 is arranged in the hollow inner cavity 2111. The connection plate 213 is also provided with an opening at the position corresponding to the opening 2112 of the rotation casing 211. An electrical connection terminal of the first electrical connection unit 215 sequentially passes through the opening of the connection plate and the opening of the rotation casing, and protrudes out of the outer wall of the rotation casing 211. As shown in FIG. 6, a second electrical connection unit 13 is also provided at the base 1. A through hole is opened in the annular groove 12 of the base 1. An electrical connection terminal of the second electrical connection unit 13 passes through the through hole 121 and is electrically connected to the electrical connection terminal of the first electrical connection unit 215.

Figure 7:
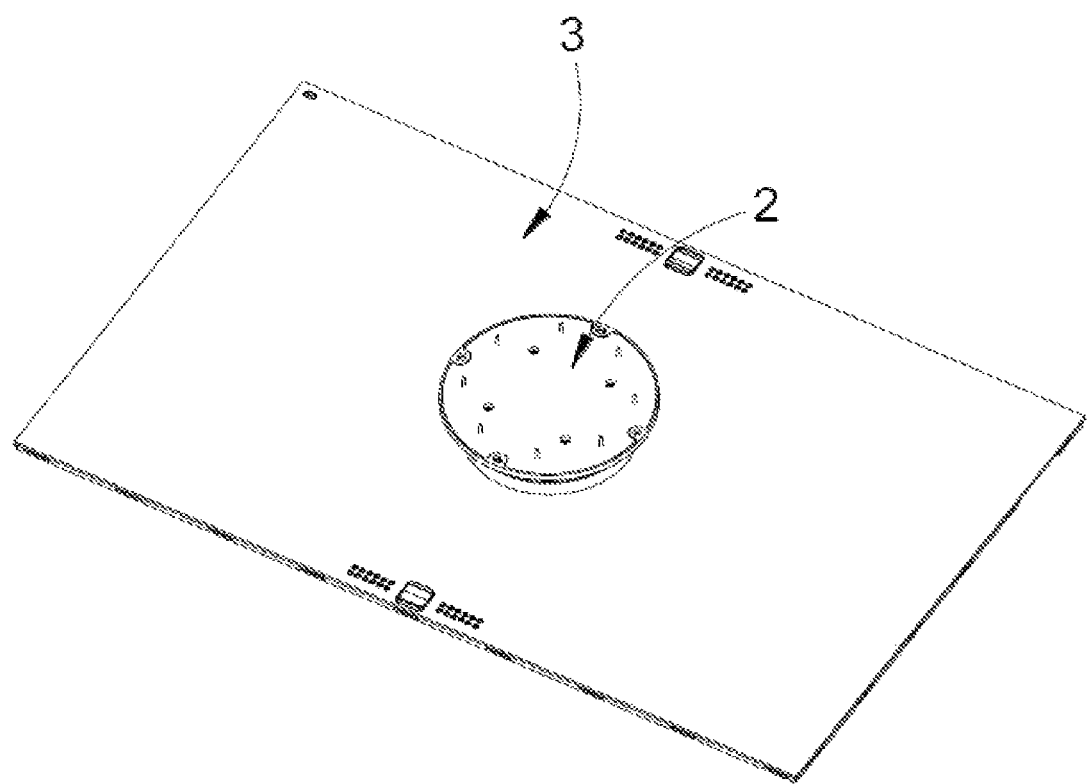
FIG. 7 is a schematic structural diagram of an example wall mount structure with a mounting plate.
Figure 8:
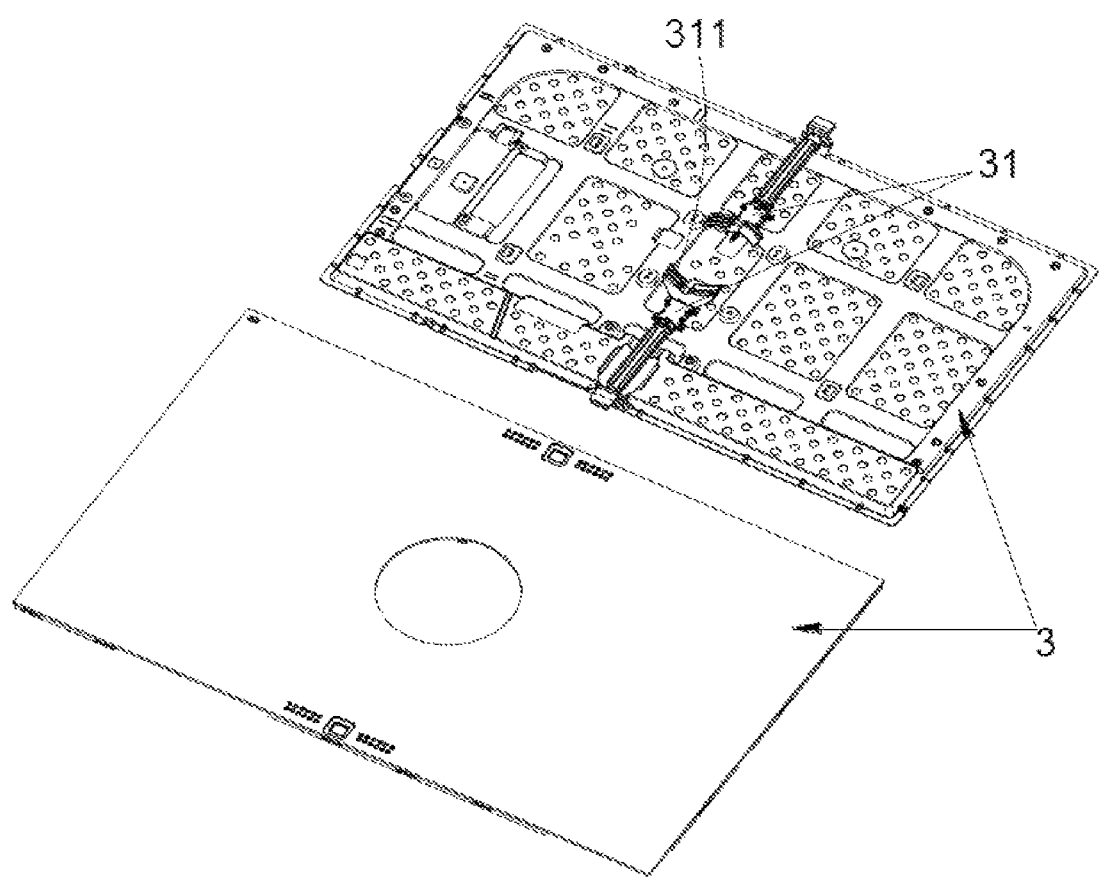
FIG. 8 is a schematic structural diagram of an example mounting plate.

FIG. 7 is a schematic structural diagram of an example wall mount structure with a mounting plate. On the basis of above-described embodiments, as shown in FIG. 7, the wall mount structure further includes a mounting plate 3. FIG. 8 is a schematic structural diagram of an example mounting plate. As shown in FIG. 8, the mounting plate 3 is fixedly mounted on the wall. The mounting plate 3 is provided with a sliding rail 31. One end of the sliding rail 31 is provided with a limitation buckle 311. As shown in FIG. 3, the outer wall of the base 1 is provided with a sliding groove 14. The inner wall of the annular groove of the base is provided with a limitation opening 15. The sliding groove 14 of the base 1 is mounted at the mounting plate 3 along the sliding rail 31, and the limitation buckle 311 is engaged with the limitation opening 15. The base 1 can be detachably mounted at the mounting plate 3 through the sliding cooperation of the sliding groove 14 and the sliding rail 31, which improves the convenience of disassembly and assembly.

In one embodiment, the limitation buckle 311 protrudes from the limitation opening 15. The limitation buckle 311 is pressed on the outer edge of the turntable 222 when the magnetic member 22 is embedded in the annular groove 12 of the base 1, to fix the relative position between the magnetic member 22 and the base 1. Pressing the limitation buckle 311 on the outer edge of the turntable 222 can improve the stability of the connection between the magnetic member 22 and the base 1, thereby ensuring using safety of the target object.

In the description of this specification, the terms "one embodiment," "some embodiments," "example," "specific example," or "some examples" refer to incorporating the embodiments or the specific features, structures, materials described in the examples or characteristics described in the examples are included in at least one embodiment or example of the present disclosure. Moreover, the specific features, structures, materials, or characteristics described can be combined in any suitable manners in one or more embodiments or examples. In addition, those skilled in the art can combine the different embodiments or examples described in this specification or the features of the different embodiments or examples when there is no conflict.

In addition, the terms "first" and "second" are used for descriptive purposes only and should not be understood as indicating or implying relative importance or implicitly indicate the number of technical features indicated. Thus, a feature described with "first" or "second" may include one or more of such feature explicitly or implicitly. In the description of the present disclosure, "plurality of" means two or more, unless otherwise specified.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A wall mount structure for hanging a target object on a wall, comprising:
    a base detachably mounted on the wall and being provided with a first magnetic unit; and
    a rotating seat including:
        a rotating member rotatably mounted at a magnetic member, and configured to rotate by a set angle relative to the magnetic member to reach a set position and connect the target object;
        the magnetic member including a second magnetic unit mutually attracted with the first magnetic unit to fix a relative position between the magnetic member and the base; and
        a limiting member connected between the rotating member and the magnetic member, and configured to limit the relative position between the rotating member and the magnetic member, and to keep the rotating member at the set position.

2. The wall mount structure of claim 1, wherein the base is provided with an annular groove, and the magnetic member is embedded in the annular groove.

3. The wall mount structure of claim 2, wherein the rotating member includes:
    a rotation casing including a hollow inner cavity, and provided with an opening connected to the hollow inner cavity on a side, wherein:
        an inner wall of the opening is provided with a limiting step;
    a rotation bearing arranged at the limiting step; and
    a connection plate located in the hollow inner cavity, buckled at a side of the rotation bearing, and fixedly connected to the magnetic member to enable the rotation casing to be rotatable relative to the magnetic member.

4. The wall mount structure of claim 3, wherein:
    the rotating member also includes an electrical connection unit arranged in the hollow inner cavity;
    an opening is provided on the connection plate at a position corresponding to the opening of the rotation casing; and
    an electrical connection terminal of the electrical connection unit sequentially passes through the opening of the connection plate and the opening of the rotation casing, and protrudes out of the outer wall of the rotation casing.

5. The wall mount structure of claim 4, wherein:
    another electrical connection unit is provided at the base;
    a through hole is opened in the annular groove of the base; and
    an electrical connection terminal of the another electrical connection unit at the base passes through the through hole and is electrically connected to the electrical connection terminal of the electrical connection unit of the rotating member.

6. The wall mount structure of claim 3, wherein:
    the magnetic member includes a turntable, and a side of the turntable close to the rotation casing is provided with a plurality of ball grooves evenly distributed at the turntable with a center of the turntable as the center of a circle and a set distance as a radius;
    the second magnetic unit is arranged at another side of the turntable opposite the plurality of ball grooves;
    the limiting member includes an elastically retractable ball arranged at the rotation casing, protruding out of an outer wall of the rotation casing, and matching one of the plurality of ball grooves at the turntable; and
    the rotation casing rotates the set distance relative to the magnetic member to cause the ball to match the one of the plurality of ball grooves at a corresponding position.

7. The wall mount structure of claim 6, wherein the ball is one of a plurality of elastically retractable balls evenly distributed at the outer wall of the rotation casing along a circumferential direction of the rotation casing, each of the plurality of balls matching one of the plurality of ball grooves.

8. The wall mount structure of claim 6, wherein:
    the rotating member also includes a bearing fixing plate buckled at a side of the rotation bearing and fixed in the hollow inner cavity of the rotation casing;
    a side of the bearing fixing plate close to the rotation bearing is provided with another annular groove to match an outer edge of the rotation bearing; and
    an outer edge of the bearing fixing plate is provided with a bayonet matching the ball.

9. The wall mount structure of claim 6, further comprising:
    a mounting plate fixedly mounted on the wall and provided with a sliding rail;
    wherein:
        one end of the sliding rail is provided with a limitation buckle;
        the outer wall of the base is provided with a sliding groove;
        the inner wall of the annular groove of the base is provided with a limitation opening; and
        the sliding groove of the base is mounted at the mounting plate along the sliding rail, and the limitation buckle is engaged with the limitation opening.

10. The wall mount structure of claim 9, wherein:
    the limitation buckle protrudes from the limitation opening; and
    the limitation buckle is pressed on the outer edge of the turntable in response to the magnetic member being embedded in the annular groove of the base, to fix the relative position between the magnetic member and the base.

* * * * *